United States Patent [19]

Tangorra

[11] 4,441,466

[45] Apr. 10, 1984

[54] ENERGY ACCUMULATOR AND INTERNAL-COMBUSTION ENGINE STARTER COMPRISING SAID ACCUMULATOR

[75] Inventor: Giorgio Tangorra, Milan, Italy

[73] Assignee: Industrie Pirelli S.p.A., Milan, Italy

[21] Appl. No.: 361,759

[22] Filed: Mar. 25, 1982

[30] Foreign Application Priority Data

Mar. 31, 1981 [IT] Italy .............................. 20828 A/81

[51] Int. Cl.³ ........................... F02N 5/00; F03G 1/04

[52] U.S. Cl. ......................... 123/179 S; 123/185 CA; 74/6; 74/130; 185/39

[58] Field of Search ......... 123/179 S, 179 SE, 185 R, 123/185 CA; 185/37, 39; 74/6, 130

[56] References Cited

U.S. PATENT DOCUMENTS

| | | | |
|---|---|---|---|
| 2,004,431 | 6/1935 | Fitzgerald | 74/6 |
| 3,080,942 | 3/1963 | Hunt | 185/39 |
| 3,205,881 | 9/1965 | Hamman | 123/179 S |
| 3,308,907 | 3/1967 | Bodkin | 185/39 |

FOREIGN PATENT DOCUMENTS

| | | | |
|---|---|---|---|
| 602649 | 3/1926 | France . | |
| 845237 | 8/1939 | France | 185/37 |
| 682788 | 11/1952 | United Kingdom | 185/37 |

*Primary Examiner*—Andrew M. Dolinar

*Attorney, Agent, or Firm*—Stevens, Davis, Miller & Mosher

[57] ABSTRACT

This invention provides an accumulator of mechanical energy and a starter for an internal-combustion engine actuated by energy from the accumulator. The energy is stored by elastically extensible elastomeric elements wound circumferentially around supports disposed according to the generatrices of a cylindrical member.

7 Claims, 4 Drawing Figures

FIG. 1
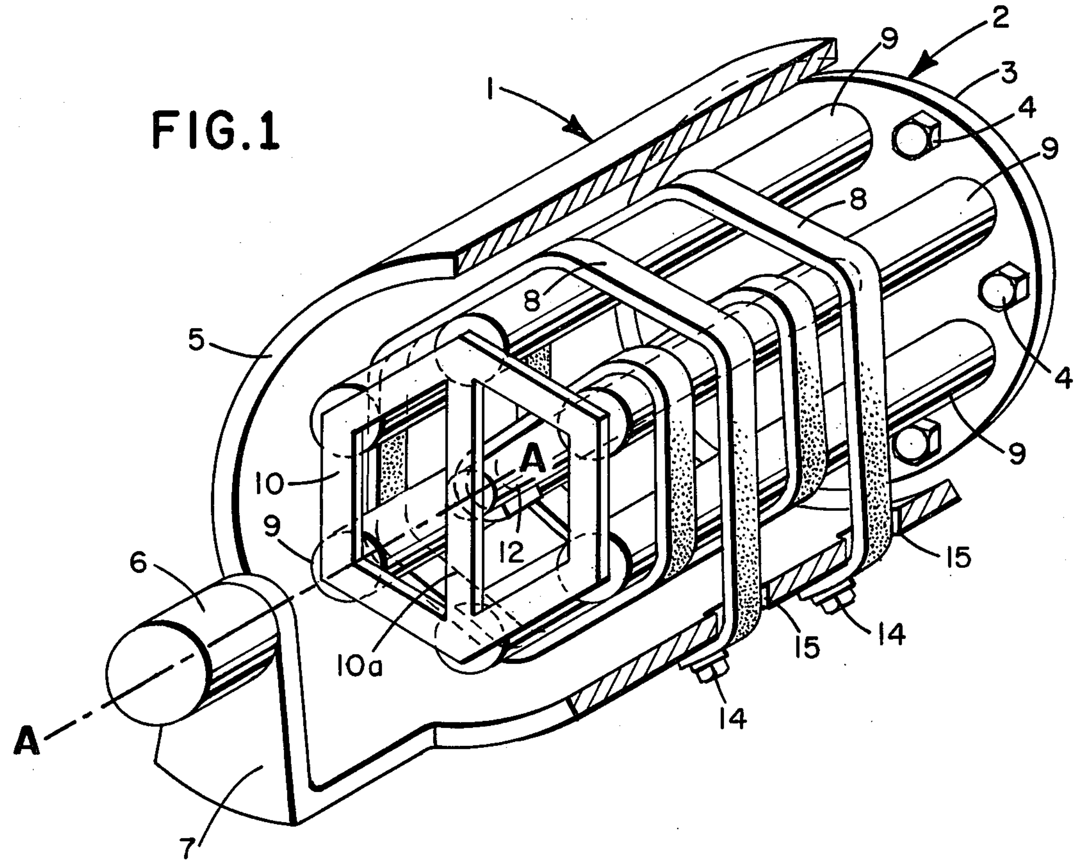
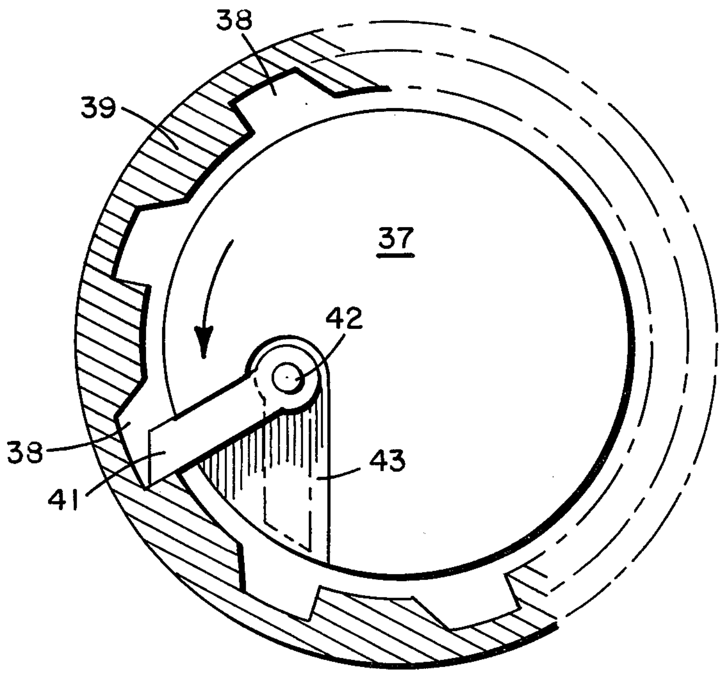
FIG. 4

ENERGY ACCUMULATOR AND INTERNAL-COMBUSTION ENGINE STARTER COMPRISING SAID ACCUMULATOR

This invention relates to an accumulator of energy and to a starter for internal-combustion engines associated with the accumulator, and, more particularly, to a mechanical accumulator of elastic energy.

Mechanical energy accumulators and mechanical starters actuated by energy transferred from said accumulators in which energy is stored by elastomeric elements that can be wound around a rotatable single central core are known. These known elastomeric elements are disposed when the accumulator is unloaded, according to a generatrix of the rotatable body which forms the central core.

This type of known accumulator has been advantageous in various applications. These known accumulators are not adaptable, however, where the number of revolutions of the elements of the accumulator are limited in number and where the accumulator must be small because it is impossible to make an entirely satisfactory accumulator of the known type of small dimensions, particularly in short axial length of the central core.

An object of the present invention is to provide an energy accumulator of minimum axial dimensions, while at the same time, always providing at least one effective practical rotation for the accumulator while insuring maintenance of a high ratio of stored energy/weight. More particularly, an object of the present invention is to provide an energy accumulator that is adapted by its axial dimension to be a flat accumulator.

A further object of the present invention is to provide a starter for internal-combustion engines that employs a flat energy accumulator that insures ignition of the internal-combustion engine with which it is associated.

A still further object of the present invention is to provide a device for starting an internal-combustion engine comprising a first device for transferring power to the energy accumulator and a second device for transferring energy to the drive shaft of an internal-combustion engine, characterized by the fact that the energy accumulator comprises: two elements of which at least one rotates with respect to the other, elastically-extensible means and, associated with one of these elements, means for supporting the extensible means disposed along at least three axes which are spaced from a fourth axis.

The present invention will be better understood from the following detail description made solely by way of nonlimiting example, with reference to the accompanying drawing wherein:

FIG. 1 is a perspective view of one embodiment of an energy accumulator according to the present invention with parts removed to expose internal parts;

FIG. 4 is a sectional view taken along the line 4—4 of FIG. 2.

Figure 3:
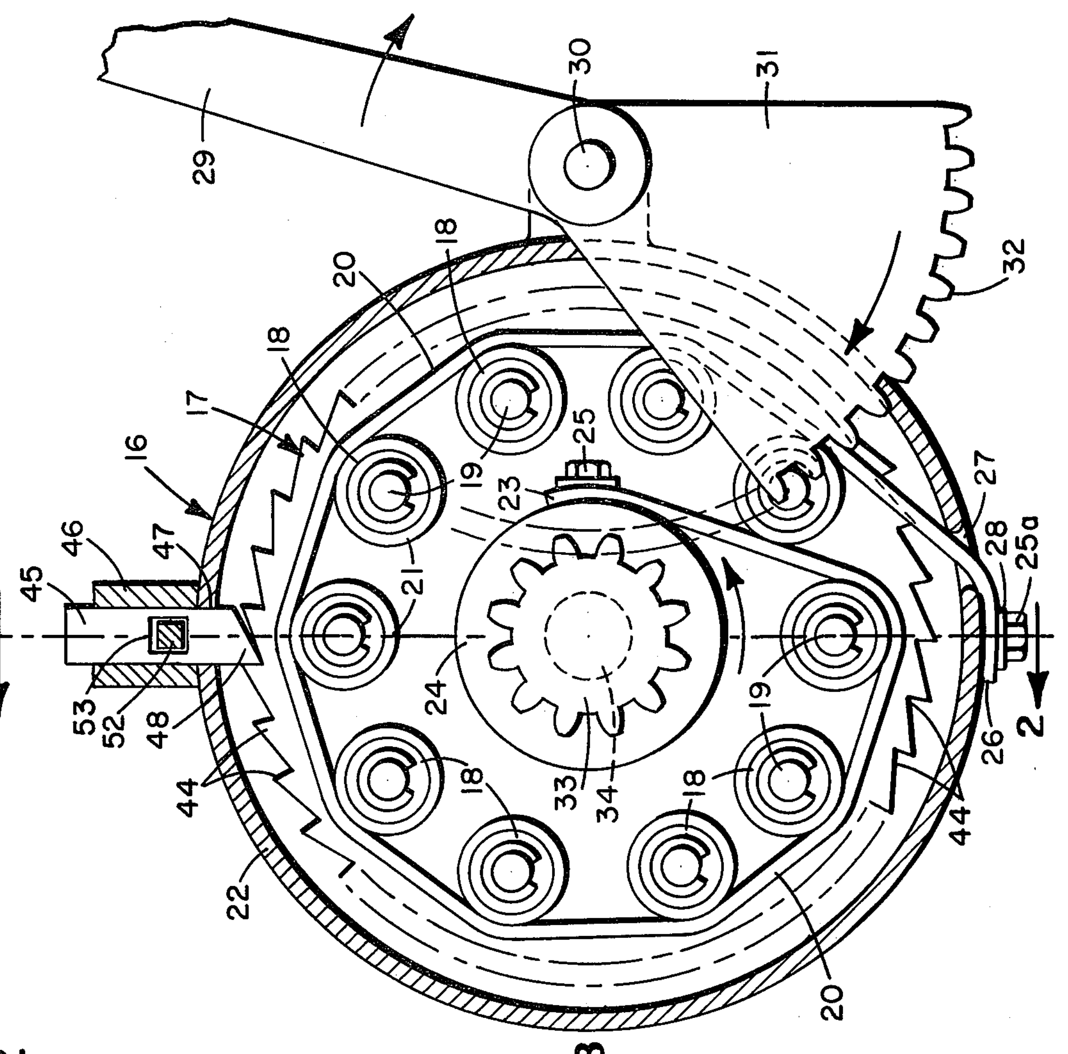
FIG. 3 is a section taken along the line 3—3 of FIG. 2.

The foregoing objects and others are accomplished in accordance with this invention, generally speaking, by providing an accumulator of mechanical energy having two elements of which at least one rotates with respect ot the other, and first elastically-extensible means comprising, associated to one of the elements, means for supporting the extensible means disposed along at least three axes that are spaced equal distances from a fourth axis.

As stated above, in its more general aspects, one embodiment of an energy accumulator according to the present invention comprises two elements of which at least one is rotatable with respect to the other, means for supporting one of the elements disposed along at least two axes, and elastically-extensible means available on the supporting means.

FIG. 1 is a perspective view of one embodiment of an energy accumulator according to the present invention. The illustrated accumulator has two elements, 1 and 2, that are co-axial to each other. Element 2 is fixed against rotation and element 1 is rotatable with respect to element 2. Element 2 is disposed inside of element 1. Element 1 is shown with some parts removed, for illustrating structure of the fixed element 2 placed inside it.

The invention contemplates an energy accumulator wherein either of the elements 1 or 2 may rotate with respect to the other.

In some embodiments, both elements 1 and 2 may be rotated but one must rotate with respect to the other such as, for example, at faster revolutions per minute (RPM).

In the particular embodiment shown in FIG. 1, the fixed element 2 is a circular plate or disk 3 fixed with bolts 4, to an external support (not shown).

Element 1 is rotatable around fixed element 2, and has a cylindrical rigid sleeve 5 forming a housing, from which one part has been removed for illustrating the structure of the enclosed fixed element 2 in a better way.

Sleeve 5 is fixed to shaft 6 through at least one rigid arm 7. The rotational axis of sleeve 5 is indicated by the line A—A.

The accumulator shown in FIG. 1 is also provided with elastically-extensible means 8 for accumulating energy. Means 8 are, in this particular embodiment of FIG. 1, two flexible elastomeric strips or bands 8. Strips 8 rest on the supporting means associated to any one of the two elements 1 or 2 within the accumulator.

In FIG. 1, the supporting means are associated with end plate 3 of the fixed element 2. The supporting means are, in general, disposed along at least three axes that are spaced equally from a fourth axis.

In FIG. 1, the supporting means are disposed according to six axes, each one of which is spaced and in particular, equally spaced from an axis placed in their center, the axis being coincident with the extension of the axis of rotation A—A of the shaft 6, i.e. of the rotatable co-axial element 1.

The supporting means shown in FIG. 1 are spaced co-axial rollers 9 idly mounted on pins (not shown) fixed to the plate 3 at one end thereof, while the opposite ends are fixed to hexagonal framework 10.

In those embodiments where the supporting means are not a single roller 9 (i.e. one roller of larger diameter, but are a plurality of co-axial rollers 9 as shown in FIG. 1), each one of rollers 9 must have a length which is at least equal to the width of the strip 8.

The elastomeric strips 8, wound around and supported by rollers 9, have one end 11 connected to a pin 12 which is fixed at one end to the disk 3 of the fixed element 2, while the opposite end is fixed to a transverse member 10*a* of framework 10. Pin 12 must be positioned inside the polygonal framework that connects the axes of the rollers 9.

The other ends 13 of strips 8 are fixed by screws 14 to the outside of sleeve 5 of element 1 after passing through holes 15 in sleeve 5.

The embodiment of the energy accumulator of the present invention (as shown in FIG. 1) is provided with two strips 8 of elastomrtic material which are the means for storing the energy.

Each strip 8 is wound more than one turn around idle rollers 9 as the mobile element 1 can be shifted axially by conventional means (not shown in the figure), as it rotates so no strip 8 overlaps itself after one turn is over.

When winding of a single turn is sufficient for strips 8, over the supporting rollers 9, strips 8 can be disposed one adjacent to the other, with their sides almost touching, to entirely cover the surface formed by rollers 9.

In this instance, for certain particular cases, a single very wide strip 8 may be used in place of several narrow adjacent strips 8.

The present invention also provides energy accumulators of the flat type, i.e. accumulators which are provided with a single strip of elastomeric material, and one of these accumulators will be described with reference to FIG. 2 and FIG. 3.

The present invention also contemplates a starter for internal-combustion engines comprising an accumulator of the type just described.

As described hereinbefore, a more general embodiment of the invention, the starter for internal-combustion engines comprises a first device for transferring power to the energy accumulator and a second device for transferring the energy to the shaft of the internal-combustion engine, the energy accumulator comprising in its turn, two elements of which at least one rotates with respect to the other and elastically-extensible means.

A starter for internal combustion engines, according to the present invention, can be provided with any accumulator of the just-defined type, i.e. for example, an accumulator of the type shown in FIG. 1.

The embodiment of a starter 16 for internal combustion motors has a flat type energy accumulator, i.e. an alternate embodiment of the accumulator of FIG. 1.

Starter 16 comprises, besides an energy accumulator of the flat type, two devices as well, one for transferring power to the accumulator and the other for transferring the power from the accumulator to the shaft of the internal-combustion engine.

By accumulator of the flat type is meant, an accumulator wherein the elastically-extensible means are disposed in a single plane, and, more particularly, they are disposed along a circumference lying in a plane that is perpendicular to the axis of rotation of the rotatable element of the accumulator.

More particularly, a flat energy accumulator is one embodiment of the accumulator described in FIG. 1 where there is present a single strip 8 of elastomeric material. The accumulator of starter 16, comprises a ratchet wheel 17 having an axis of rotation indicated by line B—B (FIG. 2).

At least three rollers 18 are disposed coaxially on wheel 17, equi-spaced around the periphery of the wheel. Anyway these rollers 18 can have different distances from the center of the wheel 17 and can be not symetrically disposed around the center of said wheel 17.

Rollers 18 are rotatably mounted on pins 19 secured to wheel 17. Rollers 18 are preferably provided with means for increasing the friction coefficient on their outer surfaces such as an elastomeric coating 21.

This accumulator also comprises a housing 22 mounted coaxially to the wheel 17 and enclosing it. Wheel 17 can rotate freely inside housing 22.

The elastically-extensible means, i.e. strip 20 of elastomeric material, has one of its ends 23 connected to ratchet wheel 17 and the other end 26 connected to outside of housing 22. The end 23 of strip 20 is connected to a hub 24 by screw 25'. Hub 24 is integral with ratchet wheel 17 and placed concentrically to the rollers 18. The opposite end 26 of strip 20 is connected to housing 22 by screw 25*a* and washer 28, after having passed through a hole 27 in the housing wall.

The starter 16 for internal-combustion engines, has, apart from the just described accumulator, a first device for transferring power to the accumulator and a second device for successively transferring the energy from the accumulator to the shaft of the internal-combustion engine.

The first device comprises a pedal 29 (see FIG. 3) hinged to a pin 30 fixed to rigid box 22. On the part far from pedal 29, with respect to the pin 30, there is present a gear sector 31 with teeth 32 meshing with a gear 33 secured to a shaft 34 integral with ratchet wheel 17.

The shaft 34 is supported in housing 22 through a suitable bearing 35. Gear 33 is located outside of the housing 22. The gear 33 and the gear-sector 31 that meshes with it are contained inside a crank-case 36 (FIG. 2) that is attached to housing 22.

The second device for transferring energy from the accumulator 16 to the shaft 40 of the internal-combustion engine, comprises (see FIGS. 2 and 4) a pawl 41 pivoted at 42 in such a way that it is able to move within a recess 43, formed in the disk 37 which is integral with wheel 17. When the disk rotates in the clockwise direction, pawl 41 allows relative rotation between disk 37 and the cylindrical sleeve 39 which is integral with engine shaft 40. When wheel 17 rotates counter-clockwise as shown in FIG. 4, pawl 41 rotates into a driving position by entering one of the notches 38 formed in cylindrical sleeve 39.

Several pawls 41 may be provided on disk 37 and they may be biased outwardly by springs (not shown).

Other centrifugally actuated driving means may be applied to this energy accumulator.

The starter 16, for internal-combustion engines (described in FIGS. 2 to 4), is also provided with means for controlling the transfer of energy from the accumulator to the internal-combustion engine, preferably acting on the rotatable element of the accumulator, i.e. for effecting the starting of the internal-combustion engine, when desired.

The means for controlling transfer of energy between the accumulator to the motor comprise a ratchet wheel 17 with teeth 44 and a pawl 45 inserted and movable in a bracket 46 attached to housing 22. Pawl 45 passes through housing 22 through a hole 47, and with its end 48, contacting teeth 44 of the ratchet wheel 17.

A spring 49 bears against one end of lever 50 which is pivoted on pin 50 in bracket 46. The other end 52 of lever 51 cooperates with an opening 53 in pawl 45 to urge the pawl into engagement with ratchet 17.

A sheath 55 provided around a cable 54 can be moved by an operator against the resistance of spring 49, on the end of lever 50 to raise the end 52, thus releasing the pawl 45 from the teeth 44.

For guaranteeing that sector 31 does not mesh with the gear 33 during the energy unloading phase of the starter 16, elastic means (not shown) are provided, which maintain the pedal 29 in the position shown in FIG. 3.

Figure 2:
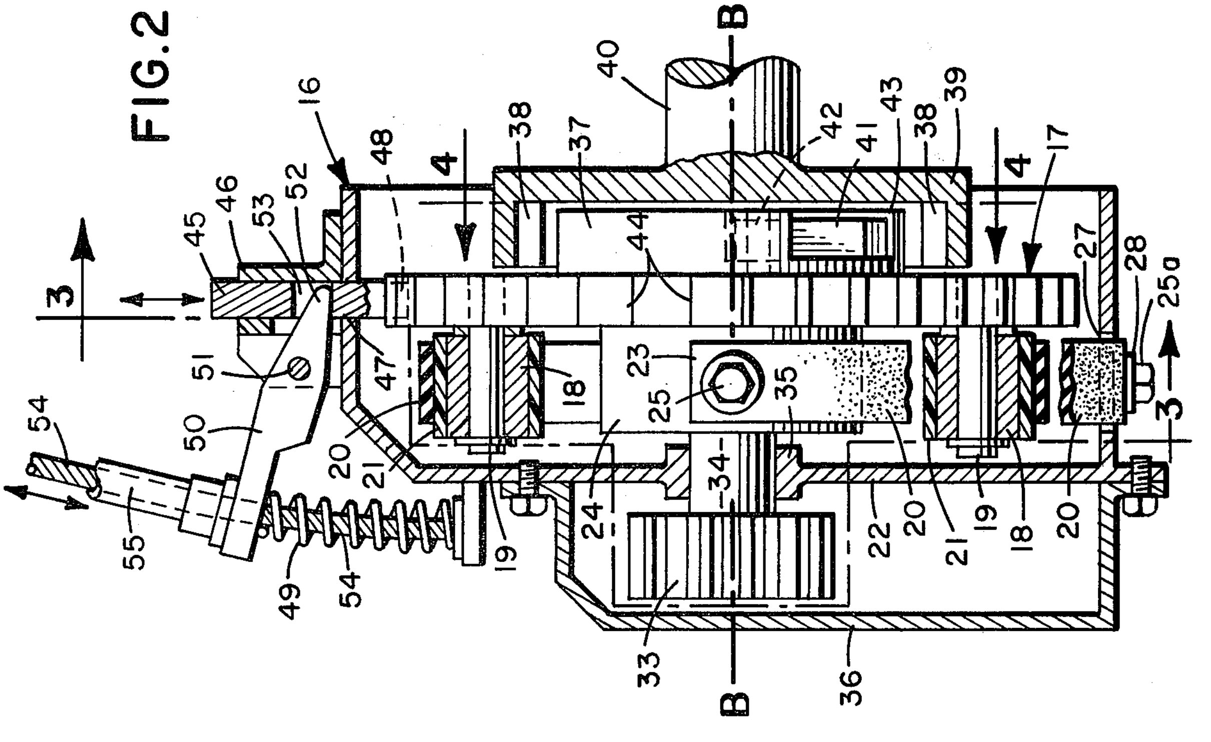
FIG. 2 is a section taken along line 2—2 of FIG. 3 in which a small starter for internal-combustion engines is illustrated.

As an alternative to the embodiment of FIGS. 2, 3 and 4, a starter according to the present invention, can be provided with an accumulator of the type illustrated in the drawing but provided with two strips of elastomeric material as the elastically-extensible means. In fact, in the case shown in the drawing, the rotatable element of the accumulator completes about one turn and a quarter, with respect to the fixed element, while in the embodiment having more than one strip 8, the number of turns would be proportionally reduced as the number of strips is increased (for example, with two strips only one relative rotation of a little over one-half turn would be required).

In such a case, reducing the elongation undergone by each strip, to maintain the high torques furnished to the shaft of the internal-combustion engine to which the starter is coupled would be reduced with its attendant advantage.

The function of an energy accumulator, according to the present invention, will now be described with reference to its applications to a starter for internal-combustion engines with reference to FIGS. 2, 3 and 4.

Assuming that starter 16 is discharged at the beginning, pedal 29 must be moved in the direction indicated by the arrow in FIG. 3. Teeth 32 of the gear-sector 31 secured to the pedal will engage with gear 33 which, because it is fixed to wheel 17, will cause it to rotate in the anti-clockwise direction (see FIG. 3).

Elastomeric strip 20 has its end 27 fixed to housing 22, and is disposed on rollers 18, with its opposite end connected to the hub 24 that rotates together with wheel 17 and with gear 33.

At this point, by acting on cable 54 that is provided with a sheath 55, and through a convenient push-button (not shown), the lever 50 is forced into raising pawl 45 against the resistance of spring 49. When the end 48 of pawl 45 is released from teeth 44 on the circumferential edge of wheel 17, strip 20 returns to its non-elongated dimension, thus releasing the loaded energy that was accumulated within it when in the stretched position. In doing so, wheel 17 is rotated in a clockwise direction (FIG. 3). At this point, the drive pawl 41 on disk 37 will rotate sleeve 39 and shaft 40 of the internal-combustion engine. The lever 41 may be moved into notch 38 by elastic means (not shown).

The accumulators, according to the present invention, have been described and illustrated in connection with starters for internal-combustion engines. However, it is to be understood that they may be used in other applications, such as those for storing energy for auxiliary motor-braking-systems for effecting the departure of any type of engines (for example, electric engines) etc.

With the energy accumulator of the present invention, the pre-fixed aims are achieved. In fact, the mechanical energy accumulators, according to the present invention, make it possible to use flat accumulators, i.e. accumulators having reduced axial dimensions.

Reduction in dimensions is obtained by guaranteeing an adequate number of turns for the starter itself and by providing an elevated torque and having a linear characteristic, as a function of the elongation of the elastically-extensible means. Moreover, because of the good ratio of stored energy/weight of the elastomeric extensible strips, reduced weights are possible while at the same time guaranteeing high torque.

Both, the small overall dimensions, as well as the reduced weight, are fundamental for use on vehicles or on watercraft.

The starters provided by the present invention, including the accumulators previously described hereabove, also achieve the aforesaid objects since they permit dependable ignition of the internal-combustion engine to which they are associated, because of the high torque that they can transfer and with an adequate number of turns such as to cause at least one complete cycle of suction, compression, ignition to the cylinder(s) of the internal-combustion engine. All this is obtained with guaranteed safety and security for the user.

Moreover, the utilization of suitably covered rollers provides the adherence between strip and rollers, so as to eliminate any relative slipping between strip and supports that can damage the strips, since these can cause surface cracks in the elastomeric material which could reduce their service-life.

Although the invention has been described in detail for the purpose of illustration, it is to be understood that such detail is solely for that purpose and that variations can be made therein by those skilled in the art without departing from the spirit and scope thereof except as it may be limited by the claims.

What is claimed is:

1. An apparatus for generating, storing and releasing mechanical energy for actuation of the shaft of an engine, said apparatus comprising a flat type accumulator, a first device for transferring power to the said accumulator, a second device for transferring the energy to the shaft of the engine, said accumulator comprising a ratchet wheel, a central hub, a plurality of rollers rotatably mounted on pins and circumferentially spaced on the wheel to form an open structure around said hub, a housing mounted coaxially with respect to the wheel, said wheel closing one end of said housing, a strip of elastomeric material connected at one end to the said central hub, wound around said rollers and supported thereby, and fixed at its opposite end to said housing; said first device comprising a shaft integral with the wheel and supported through a bearing in said housing, a first gear integral with said shaft, a second gear for meshing with said first gear, said two gears being located in a crank-case outside of said housing; said second device comprising a disk integral with said wheel on the side of the wheel opposite to the rollers, a cylindrical sleeve integral with said engine shaft, and means for connecting said disk and said sleeve when the wheel rotates in a predetermined sense of rotation.

2. The apparatus of claim 1 including a pawl engageable with said ratchet wheel to hold said ratchet wheel in a stationary position when engaged and when disengaged to permit rotation of said ratchet wheel and said second device.

3. The apparatus of claim 2 in which said pawl is moved to engaged and disengage said ratchet wheel by means of a lever which is resiliently biased normally to hold the pawl in the engaged position.

4. The apparatus of claim 3 including a cable for remote control of said lever and pawl.

5. An apparatus for generating, storing and releasing mechanical energy for actuation of a movable device, said apparatus comprising an open ended substantially cylindrical housing which encloses a space and is rotatable about its longitudinal axis, and disposed within the space enclosed by the housing a frame comprising a substantially circular plate member closing a first end of the housing and an assembly of bars fixed together to form an open structure which is polygonally shaped in front elevation, is disposed in said housing adjacent to the housings second open end and faces said circular plate member, a series of circumferentially spaced co-axial rollers fixed at one end to the open structure at each of the angles between adjoining bars of said open polygonal shaped structure and at its opposite end to said circular plate member, a pin fixed at one end to said open polygonal shaped structure and at its opposite end to said circular plate member disposed substantially along the center longitudinal axis of the series of rollers, a flexible, extensible elastomeric strip fixed at one end to said pin, wound around said series of rollers and supported thereby and fixed at its opposite end to said housing whereby upon rotation of said housing about the said series of rollers the elastomeric strip is stretched and mechanical energy is stored therein for release when the strip contracts.

6. The energy accumulating apparatus of claim 5, wherein a plurality of flexible, extensible, elastomeric bands are helically wound around said series of rollers.

7. The energy accumulating apparatus of claim 6, wherein the elastomeric bands are natural or synthetic rubber.

* * * * *